ROTARY CUTTER AND METHOD

Original Filed Jan. 18, 1965 2 Sheets-Sheet 1

INVENTOR.
ROBERT L. VAUGHN
BY
George C. Sullivan
Agent

ROTARY CUTTER AND METHOD

Original Filed Jan. 18, 1965 2 Sheets-Sheet 2

INVENTOR.
ROBERT L. VAUGHN
BY
George C. Sullivan
Agent

United States Patent Office

Re. 26,637
Reissued July 29, 1969

26,637
ROTARY CUTTER AND METHOD

Robert L. Vaughn, Granada Hills, Calif., assignor to Lockheed Aircraft Corporation, Burbank, Calif.

Original No. 3,329,065, dated July 4, 1967, Ser. No. 426,014, Jan. 18, 1965. Application for reissue Nov. 13, 1967, Ser. No. 686,000
Int. Cl. B26d *1/14*
U.S. Cl. 29—105 2 Claims

Matter enclosed in heavy brackets [ ] appears in the original patent but forms no part of this reissue specification; matter printed in italics indicates the additions made by reissue.

*ABSTRACT OF THE DISCLOSURE*

*A rotary cutter wherein a plurality of cutting discs are spaced around a central axis and are rotated on their own axes as they contact the workpiece.*

This invention relates to cutting tools, and more particularly to a rotary type cutter and method for high speed metal removal. This invention pertains especially to present day aerospace materials which by their toughness are very hard to machine at high rates of metal removal.

Presently known milling cutters whether used on horizontal or vertical machine tools are extremely costly and have low rates of metal removal. Such cutters are time consuming not only because of excessive workpiece floor-to-floor time but also due to the very low tool life which necessitates replacement. Another problem of standard cutters is the high heat generated by the point contact of the tool and workpiece which cannot be readily dissipated and thus contributes to a high rate of tool wear and frequent replacement. The rotary cutter, described herein, eliminates the heat problem of point contact, increases tool life, reduces cutter replacement, increases metal removal rates, and reduces machining costs.

A rotary tool which is a cylindrical or conical cutting tool free to rotate about its axis has been previously used for lathe operations. Such a tool is illustrated in United States Patents 2,233,724 and 2,513,881. In several instances, a rotary tool has shown much greater life under given cutting conditions than a stationary or non-rotating tool.

According to this invention, a milling cutter is illustrated as employing cutters or cutting inserts which are free to rotate about their own axes.

It is accordingly an object of the invention to provide a unique milling cutter which employs rotating cutting tools.

Another object is to provide increased tool life for cutting inserts.

Another object is to provide a milling cutter which substantially increases metal removal rates.

These and other related objects will become more apparent from the following detailed description when taken with the accompanying drawings in which.

Figure 1:
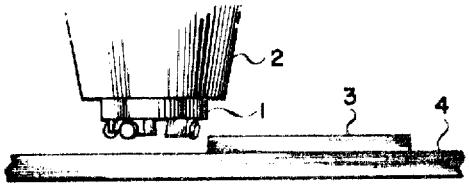
FIG. 1 is an elevational view of the tool in operative relation to a workpiece.

Reference is now made to FIG. 1 in which the rotary cutting tool generally designated by the reference character 1 is illustrated as attached to the spindle 2 of a standard vertical milling machine (not shown). The workpiece 3 is supported on the table 4 and moves beneath the cutters in the conventional manner.

Figure 2:
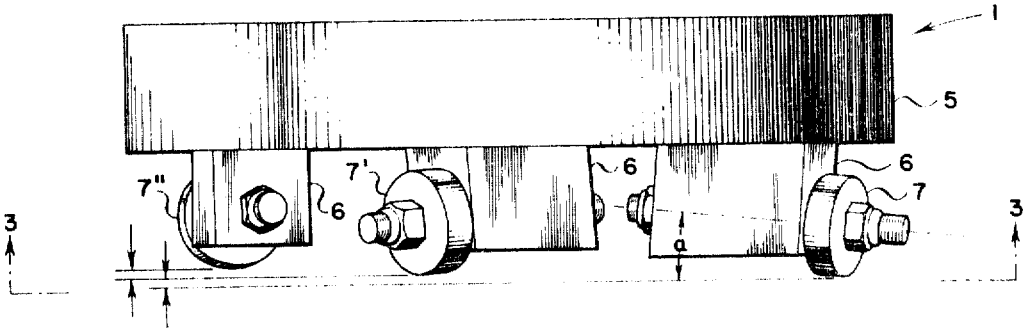
FIG. 2 is a side elevation of the tool.
Figure 3:
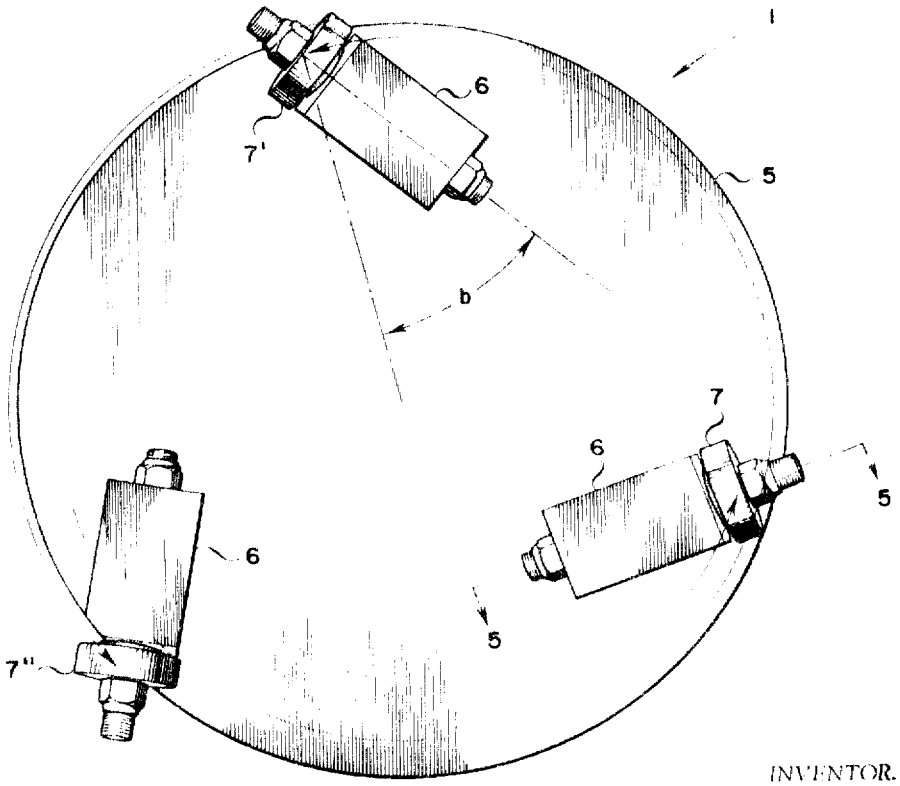
FIG. 3 is a front view of the tool taken along the line 3—3 of FIG. 2.

In FIGS. 2 and 3, the rotary milling cutting tool 1 is shown as consisting of a cutter body or plate 5 to which are integrally attached a plurality of supports 6 for holding the cutters 7 and associated bearings in a rotating arrangement. While three supports and cutters are illustrated, it will be understood that the invention is not to be so restricted. For example, the invention has been utilized employing one, three, and six cutters. As illustrated in FIG. 3 the cutters are set at an angle B to the radius from the center of the cutter plate 5. This angle is approximately 35° and can be compared to the radial rake angle of conventional cutters. Utilizing three cutters as shown, the axes of the three cutters are approximately 120° from each other. As illustrated by the solid arc terminating in an arrow at the contact point of each cutter. The cutters are progressively spaced farther from the center of the cutter plate. The spacing from the center is greatly exaggerated for sake of clarity.

In FIG. 2, the axes of the cutter is shown as being inclined with respect to the horizontal work surface. This angle A may be compared to the axial rake of conventional cutters. In addition, the spacing of the cutters from the lower surface of the cutter body increases progressively and is likewise exaggerated for clarity.

Figure 4:
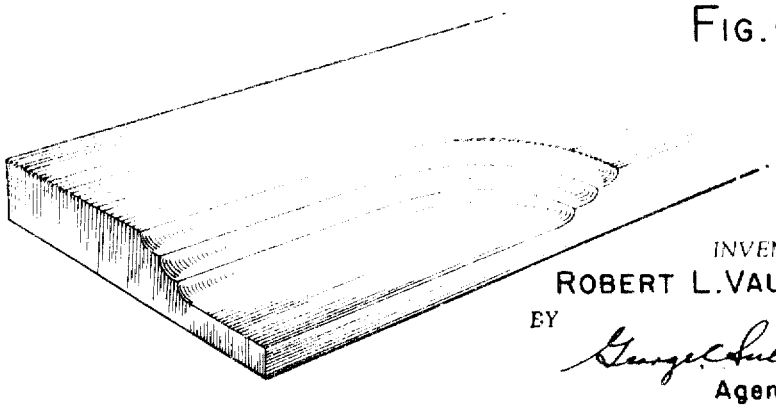
FIG. 4 is a perspective view of a workpiece showing a typical cut.

The unique and unobvious cutting characteristics of the tool made in accordance with the invention will be appreciated by reference to FIG. 4, where a typical cut, exaggerated in approximately the same degree as the cutter position in FIGS. 2 and 3, is illustrated. Thus, as the cutter body rotates in the direction indicated by the arrows in FIG. 3, the cutters contact the surface of the workpiece and rotate on their own axes due to friction with the workpiece. It thus becomes apparent that the first step-like cut (FIG. 4), i.e., nearest the upper surface of the workpiece, has been made by cutter 7″, the middle step by cutter 7′, and the bottom step by the cutter 7. As the work is fed beneath the cutter, the metal is successively removed in a step-wise fashion, with the step advancing on the work.

Thus, one unique feature of the rotary cutter is the ability of the individual cutters or cutting inserts to rotate about their own axes. That is, the circular cutters begin to rotate upon entering the workpiece and are driven by the cutting friction. Rotation is continuous until they leave the work. This allows effective cutting while maintaining uniform wear around the entire cutting edge. Therefore, full utilization of the cutting edge is achieved and the need for indexing the insert is eliminated. The inserts can be turned over, however, to expose the opposite cutting edge once maximum allowable wear has been obtained. This allows two complete cutting edges per unit to be utilized. Furthermore, as mentioned later, the circular inserts may be mounted in pairs. One insert is used to provide back-up support for cutting insert and the combination provides easy accessibility of four cutting edges.

Another aspect or unique feature of this cutter which distinguishes it from standard multi-toothed milling cutters, is that all of the cutting inserts operate in different planes at different radii. As an example, the cutter insert at the largest radius takes the first cut; the next cutter is stepped down 0.20 inch and acts as a .200 inch smaller radius. In effect then, the radial and axial stepping provides a series of three individual fly-cutters following each other. Two advantages result from this multi-tooth fly-cutter concept. First, the dimensional tolerances on the cutter can be increased since none of the cutter inserts operate in the same plane and critical grinding is not necessary. Second, greater depths can be taken off the workpiece per pass. Since space and cutter design limits the maximum depth that one insert can take, several inserts increase the depth proportionately.

Figure 6:
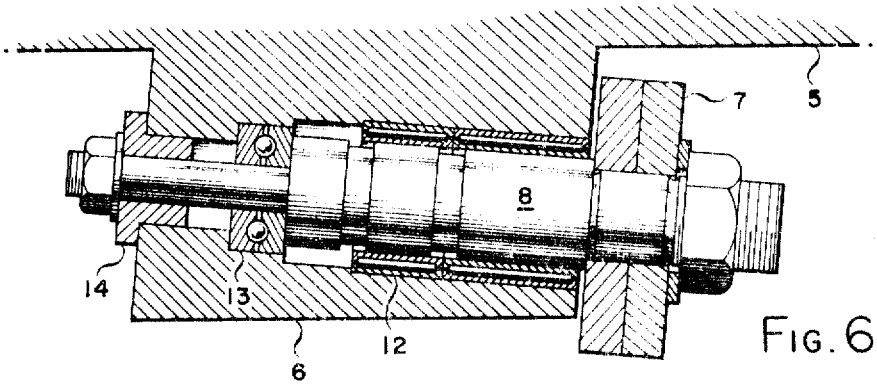
FIG. 6 is a sectional view of the cutter shown in FIG. 5 with a modified bearing.
Figure 5:
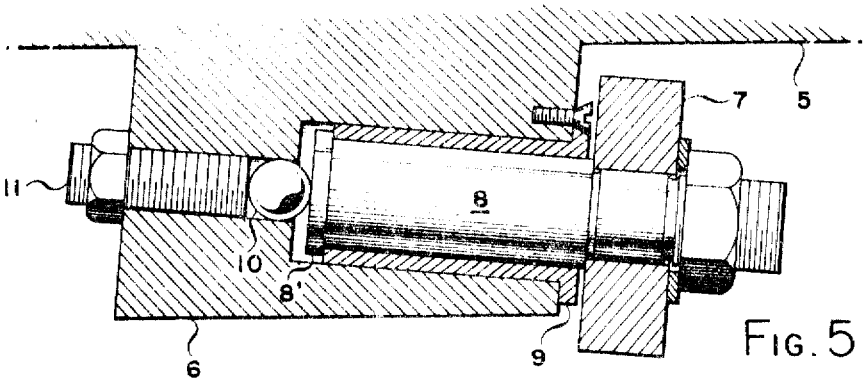
FIG. 5 is a sectional view of the cutter taken along the line 5—5 of FIG. 3.

Details of the cutter support and bearing are shown in FIGS. 5 and 6. In FIG. 5, the cutter 7 is mounted on shaft 8, which has an enlarged head 8' on one end and a threaded portion at the other. A bushing 9 retains the shaft in place in the support 6 and the cutter is retained on the shaft by means of a nut and washer as indicated. A thrust bearing is provided by the ball bearing 10. The adjusting screw 11 and associated lock nut provide for preloading the bearing.

FIG. 6 illustrates another embodiment of a bearing and support. The cutter, shown as consisting of a pair of inserts, is retained on the shaft by a nut and washer, Rolling support for the shaft is provided by needle bearings 12, while the thrust load is absorbed by the thrust bearing 13, which may be a needle thrust bearing if preferred. Shaft retainer 14 and the associated nut permit preloading the thrust bearing and retains the rotating assembly in the support.

The cutters, or cutting inserts, are preferably made of carbide, such as tungsten carbide and cobalt, though high speed steel may be used if desired. The carbides are particularly useful when working with the newer aerospace materials such as titanium and its alloys.

It is believed that the invention as described represents a substantial advance in the art of metal removal. As the spindle and associated adaptor plate rotates, each of the cutters are caused to rotate on their own axes, thereby permitting a continuous cutting edge to be used which promotes cooling and fluid flow.

While specific embodiments of the invention have been shown and described, it should be understood that certain alterations, modifications and substitutions may be made to the instant disclosure without departing from the spirit and scope of the invention as defined by the appended claims.

What is claimed is:

1. A milling cutter for increased rate of metal removal comprising a circular plate, a plurality of supports integrally attached to and projecting from one surface of said plate, a shaft [rotatably] mounted in each support and having one end projecting from said support, a *freely and operatively* rotatable cutting disc mounted on the projecting end of each shaft, and means for rotating said plate about its central axis, said shafts being inclined at an angle with respect to the surface of said plate and at an angle with respect to a radius of the circular plate.

2. A milling cutter as defined by claim 1 wherein the cutting discs are successively positioned at different radii and at different axial distances from the surface of said plate.

References Cited

The following references, cited by the Examiner, are of record in the patented file of this patent or the original patent.

UNITED STATES PATENTS

| | | | |
|---|---|---|---|
| 901,681 | 10/1908 | Collet | 29—105 X |
| 2,233,724 | 3/1941 | Bannister et al. | 29—96 |
| 2,348,089 | 5/1944 | Niekirk | 29—105 |
| 2,651,223 | 9/1953 | Hahn | 29—96 X |
| 2,885,766 | 5/1959 | Ernst et al. | 29—105 |

FOREIGN PATENTS

| | | |
|---|---|---|
| 795,993 | 6/1958 | Great Britain. |
| 504,098 | 12/1954 | Italy. |

LEONIDAS VLACHOS, Primary Examiner

U.S. Cl. X.R.

29—102; 90—11